(12) United States Patent
Ferrari et al.

(10) Patent No.: US 11,083,031 B1
(45) Date of Patent: Aug. 3, 2021

(54) BLUETOOTH AUDIO EXCHANGE WITH TRANSMISSION DIVERSITY

(71) Applicant: Sonova AG, Stafa (CH)

(72) Inventors: Federico Ferrari, Bern (CH); Amre El-Hoiydi, Neuchatel (CH); Alessandro Gallo, Murten (CH)

(73) Assignee: SONOVA AG, Stäfa (CH)

( * ) Notice: Subject to any disclaimer, the term of this patent is extended or adjusted under 35 U.S.C. 154(b) by 0 days.

(21) Appl. No.: 16/834,431

(22) Filed: Mar. 30, 2020

Related U.S. Application Data

(63) Continuation-in-part of application No. 16/739,531, filed on Jan. 10, 2020, and a continuation-in-part of application No. 16/739,153, filed on Jan. 10, 2020, and a continuation-in-part of application No. 16/739,593, filed on Jan. 10, 2020.

(51) Int. Cl.
| | |
|---|---|
| *H04W 84/20* | (2009.01) |
| *H04W 76/14* | (2018.01) |
| *H04R 25/00* | (2006.01) |
| *H04W 24/08* | (2009.01) |

(52) U.S. Cl.
CPC .......... *H04W 76/14* (2018.02); *H04R 25/554* (2013.01); *H04W 24/08* (2013.01); *H04W 84/20* (2013.01)

(58) Field of Classification Search
CPC ....... H04W 4/80; H04W 84/12; H04W 24/00; H04W 76/15; H04W 76/19; H04W 84/20; H04R 5/033; H04R 1/1016
See application file for complete search history.

(56) References Cited

U.S. PATENT DOCUMENTS

| | | |
|---|---|---|
| 5,511,128 A | 4/1996 | Lindemann |
| 5,651,071 A | 7/1997 | Lindemann et al. |
| 8,526,648 B2 | 9/2013 | Dijkstra et al. |
| 9,247,355 B2 | 1/2016 | El-Hoiydi |
| 9,544,699 B2 | 1/2017 | Haubrich et al. |

(Continued)

FOREIGN PATENT DOCUMENTS

| | | |
|---|---|---|
| DE | 43 27 901 C1 | 2/1995 |
| EP | 0 855 130 B1 | 3/2004 |

(Continued)

*Primary Examiner* — Tu X Nguyen
(74) *Attorney, Agent, or Firm* — Pearne & Gordon LLP

(57) ABSTRACT

Provided is a method for operating two hearing devices. The method includes establishing a first bi-directional wireless connection between a primary hearing device and a wireless communication device over a first wireless link, eavesdropping on the first wireless link, by a secondary hearing device, over a second wireless link between the wireless communication device and the secondary hearing device, and establishing a second bi-directional wireless connection between the primary hearing device and the secondary hearing device over a third wireless link. The method further includes monitoring the link quality of the first wireless link and/or the second wireless link, and assigning to either the secondary hearing device or the primary hearing device the role of transmitting audio-related packets towards the wireless communication device, based on the quality of at least one of the first wireless link or the second wireless link. An audio communication system is also provided.

21 Claims, 8 Drawing Sheets

(56) References Cited

U.S. PATENT DOCUMENTS

| | | | |
|---|---|---|---|
| 9,980,189 B2 | 5/2018 | Belverato | |
| 10,178,711 B2 | 1/2019 | Li et al. | |
| 10,244,307 B1 | 3/2019 | Tong et al. | |
| 10,284,971 B2 | 5/2019 | Secall et al. | |
| 10,348,370 B2 | 7/2019 | Thoen et al. | |
| 10,840,995 B1 * | 11/2020 | Luong | H04B 7/061 |
| 2015/0319557 A1 * | 11/2015 | El-Hoiydi | H04W 4/60 |
| | | | 455/41.2 |
| 2015/0326984 A1 | 11/2015 | Haubrich | |
| 2018/0176717 A1 | 6/2018 | Fu et al. | |
| 2019/0044576 A1 | 2/2019 | Thoen et al. | |
| 2020/0053612 A1 * | 2/2020 | Jorgovanovic | H04M 1/05 |

FOREIGN PATENT DOCUMENTS

| | | |
|---|---|---|
| EP | 1 017 253 B1 | 10/2012 |
| WO | 2008/089784 A1 | 7/2008 |
| WO | 2019/129748 A1 | 7/2019 |

* cited by examiner

Front pocket

OK

Back pocket Arms up

OK

Back pocket Arms down

Not OK

BLUETOOTH AUDIO EXCHANGE WITH TRANSMISSION DIVERSITY

CROSS REFERENCE TO RELATED APPLICATION(S)

This application is a continuation of U.S. patent application Ser. No. 16/739,153 filed on Jan. 10, 2020; U.S. patent application Ser. No. 16/739,531 filed on Jan. 10, 2020; and U.S. patent application Ser. No. 16/739,593 filed on Jan. 10, 2020, the entire contents of which are incorporated herein by reference.

FIELD OF INVENTION

The following description relates generally to wireless communication. More specifically, the following description relates to exploiting diversity in transmission of packets for hearing devices that are streaming information from a wireless communication device.

BACKGROUND OF INVENTION

Wireless technologies allow wireless communications between hearing devices and/or between hearing devices and a wireless communication device (also referred to as a "remote device" or an "audio source" if it is transmitting audio information). The audio source can be an external device (such as a mobile phone, tablet, iPod, etc.) that transmits audio packets, which are received by the hearing device. A hearing device can stream audio from an audio source using an Advanced Audio Distribution Profile (A2DP). For example, a hearing device can use Bluetooth Basic Rate/Enhanced Data Rate™ (Bluetooth BR/EDR™) to stream music from a smartphone configured to transmit audio using A2DP.

Because Bluetooth BR/EDR™ is generally a point-to-point communication, it may be necessary for one of two hearing devices worn by a user to eavesdrop an audio stream to hear audio in stereo while the other hearing device maintains a point-to-point Bluetooth BR/EDR™ connection. Specifically, a primary hearing device may establish a wireless connection with an audio source and begin streaming music, and a secondary audio device can eavesdrop the audio stream (e.g., without a wireless connection to the audio source). The primary hearing device can receive audio packets for the left stereo channel and the secondary hearing device can eavesdrop audio packets for the right stereo channel (or vice versa). Accordingly, A2DP eavesdropping allows the hearing device user to listen to an audio stream in stereo despite Bluetooth BR/EDR™ being a point-to-point connection.

To provide a reliable audio stereo stream experience for a hearing device user, an audio source should quickly receive an acknowledgment; otherwise, it cannot proceed with transmission of a next audio packet and a level of an audio buffer of the hearing device begins to decrease, which may cause annoying interruptions for the hearing device user if the buffer is empty. Yet, receiving an acknowledgment quickly is not always possible for at least a few reasons.

For example, in the 2.4 GHz Industrial, Scientific, and Medical (ISM) band, wirelessly transmitting information from an audio source to a hearing device can include errors and/or signal degradations because of body shadowing. Body shadowing refers to the interference of a body part with the transmission or reception of packets. Depending on the position of the hearing devices and an audio source, wireless communication can be difficult. For example, a person's head can block the reception or transmission of an acknowledgment packet. Body movements can further exacerbate the body shadowing problem. Other technologies in the ISM band, such as Bluetooth Low Energy™, Wi-Fi™, and ZigBee™, for example, experience similar errors and/or signal degradation due to body shadowing.

In addition, due to size and battery life limitations, hearing devices typically radiate wireless signals with a significantly smaller strength than typical audio sources (e.g., a smartphone). A hearing device usually transmits at a power of 0 dBm. However, mobile phones transmit at a power of up to 20 dBm. Because the transmit powers of the hearing device and the mobile phone are substantially different (i.e., asymmetric), when the distance between the hearing device and the mobile phone exceeds a certain range, the quality of the wireless link from the hearing device to the mobile phone deteriorates and the quality of the transmitted audio deteriorates as a result. This power asymmetry may result in situations where (at least one of) a pair of hearing devices correctly receives audio packets, but the audio source fails to receive acknowledgments.

Further, in wireless communications between hearing devices and a wireless communication device (such as a mobile phone, for example), the user's voice can be captured by a microphone that may be part of a transmission unit of a hearing device worn by a user. The captured audio can be transmitted wirelessly directly towards another hearing device or towards the wireless communication device, which can receive the audio packets. A hearing device usually transmits at a power of 0 dBm for power consumption limitation reasons. The antenna of the hearing device is very small and lossy on both the transmission and the reception side. As a result, the transmission range from a transmitting hearing device cannot be as large as the transmission range from a wireless microphone, for example. Because of these limitations in the transmission range from a transmitting hearing device, in situations where the distance between the hearing devices or the distance between a hearing device and the wireless communication device, exceeds a certain range or where the transmitting hearing device may be shadowed by the user's head, for example, the wireless link quality can deteriorate and the quality of the transmitted audio can deteriorate as a result.

Accordingly, a need exists to address at least the above identified problems and provide additional benefits. Specifically, a need exists for a system, method, software, or hearing device that is capable of improving wireless communication between a wireless communication device and hearing devices.

SUMMARY

The present invention provides improved audio transmission between hearing devices that are streaming audio information from a wireless communication device (also referred to as an "audio source" if it is transmitting audio information) or transmitting the user's voice is captured by a microphone wirelessly directly towards another hearing device or the wireless communication device, which can receive the audio packets. Specifically, the present invention proposes solutions to improve and provide reliable transmission between the hearing devices and the wireless communication device, in situations when the wireless communication link between the devices may be unreliable. More specifically, the disclosed technology assigns to one of the hearing devices the role of transmitting audio-related packets towards the wireless communication device based on the quality of the wireless communication links between each of the hearing devices and the wireless communication device. As a result, the achieved transmission range may not be limited where the audio transmitting device may be shadowed by the user's head, for example. Improving the reception range (i.e., reception diversity) may also be achieved. Combining transmit diversity and reception diversity can provide an improved range regardless of the orientation of the user's head or body on both the transmitter and receiver side.

In one general aspect, a method for operating two hearing devices may include establishing a first bi-directional wireless connection between a primary hearing device and a wireless communication device over a first wireless link; eavesdropping on the first wireless link, by a secondary hearing device, over a second wireless link between the wireless communication device and the secondary hearing device; establishing a second bi-directional wireless connection between the primary hearing device and the secondary hearing device over a third wireless link; monitoring, by the primary hearing device, a link quality of the first wireless link and/or by the secondary hearing device, the link quality of the second wireless link; assigning to the secondary hearing device a role of transmitting audio-related packets towards the wireless communication device, in place of the primary hearing device, based on quality parameters of at least one of the first wireless link or the second wireless link; and returning to the primary hearing device the role of transmitting audio-related packets towards the wireless communication device based on the quality parameters of at least one of the first wireless link or the second wireless link.

In the method according to the foregoing aspect, the assigning to the secondary hearing device the role of transmitting audio-related packets towards the wireless communication device may be based on one of a degradation of the first wireless link quality or an improvement of the second wireless link quality.

In the method according to the foregoing aspect, the returning to the primary hearing device the role of transmitting audio-related packets towards the wireless communication device may be based on one of a degradation of the second wireless link quality or an improvement of the first wireless link quality.

In the method according to the foregoing aspect, during audio streaming, the primary hearing device may remain in the first bi-directional wireless connection with the wireless communication device and transmits to the wireless communication device packets that are not audio-related, regardless of which hearing device has the role of transmitting audio-related packets towards the wireless communication device.

In the method according to the foregoing aspect, the wireless link quality of the first or second wireless link can be measured via measuring an outgoing packet error rate.

In the method according to the foregoing aspect, the outgoing packet error rate can be calculated by monitoring a number of transmit attempts of outgoing audio frames.

In the method according to the foregoing aspect, the outgoing packet error rate can be calculated by monitoring duplicate incoming audio packets transmitted by the wireless communication device.

In the method according to the foregoing aspect, the role of transmitting audio-related packets can be transferred from the primary hearing device to the secondary hearing device when the outgoing packet error rate on the first wireless link exceeds a predefined threshold.

In the method according to the foregoing aspect, the wireless link quality of the first or second wireless link can be measured via measuring an incoming packet error rate.

In the method according to the foregoing aspect, the role of transmitting audio-related packets can be transferred from the secondary hearing device to the primary hearing device when the outgoing packet error rate on the second wireless link exceeds a predefined threshold.

In the method according to the foregoing aspect, the role of transmitting audio-related packets can be transferred from the primary hearing device to the secondary hearing device when the incoming packet error rate on the second wireless link is lower than the incoming packet error rate on the first wireless link.

In the method according to the foregoing aspect, the role of transmitting audio-related packets can be transferred from the secondary hearing device to the primary hearing device when the incoming packet error rate on the first wireless link is lower than the incoming packet error rate on the second wireless link.

In the method according to the foregoing aspect, the audio-related packets can be at least one of audio packets or acknowledgements to audio packets.

In the method according to the foregoing aspect, the audio-related packets can be transmitted using a Logical Link Control and Adaptation Protocol (L2CAP) with a destination Channel ID (CID) field that corresponds to a destination channel endpoint that has been configured for an Advanced Audio Distribution Profile (A2DP) audio packets when an A2DP connection has been established.

In the method according to the foregoing aspect, the audio-related packets can be Enhanced Synchronous connection-oriented ("eSCO") audio packets.

In the method according to the foregoing aspect, the first and second wireless links and the third wireless link can use different wireless communication protocols.

In the method according to the foregoing aspect, the communication protocol used in the first and second wireless links can be associated with BLUETOOTH and the communication protocol used in the third wireless link can be a proprietary wireless communication protocol.

In the method according to the foregoing aspect, the packets that are not audio related can be one of a Link Management Protocol (LMP) data unit or a Logical Link Control and Adaptation Protocol (L2CAP) data unit addressed to a CID different than a destination channel endpoint for A2DP.

In another general aspect, an audio communication system is provided. The audio communication system can include a primary hearing device configured to establish a first bi-directional wireless connection with a wireless communication device over a first wireless link, and a secondary hearing device configured to eavesdrop on the first wireless link, over a second wireless link between the wireless communication device and the secondary hearing device, and establish a second bi-directional wireless connection with the primary hearing device over a third wireless link. The primary hearing device and the secondary hearing device can be both configured to monitor a link quality of the first wireless link and/or the link quality of the second wireless link, assign to the secondary hearing device a role of transmitting audio-related packets towards the wireless communication device, in place of the primary hearing device, based on quality parameters of at least one of the first wireless link or the second wireless link, and return to the primary hearing device the role of transmitting audio-related packets towards the wireless communication device based on the quality parameters of at least one of the first wireless link or the second wireless link.

In the audio communication system according to the foregoing aspect, during audio streaming, the primary hearing device can remain in the first bi-directional wireless connection with the wireless communication device and transmit to the wireless communication device packets that are not audio-related, regardless of which hearing device has the role of transmitting audio-related packets towards the wireless communication device.

Other features and aspects may be apparent from the following detailed description, the drawings, and the claims.

BRIEF DESCRIPTION OF THE DRAWINGS

The foregoing and other aspects of the present disclosure will become apparent to those skilled in the art to which the present disclosure relates upon reading the following description with reference to the accompanying drawings, in which.

Figure 1C:
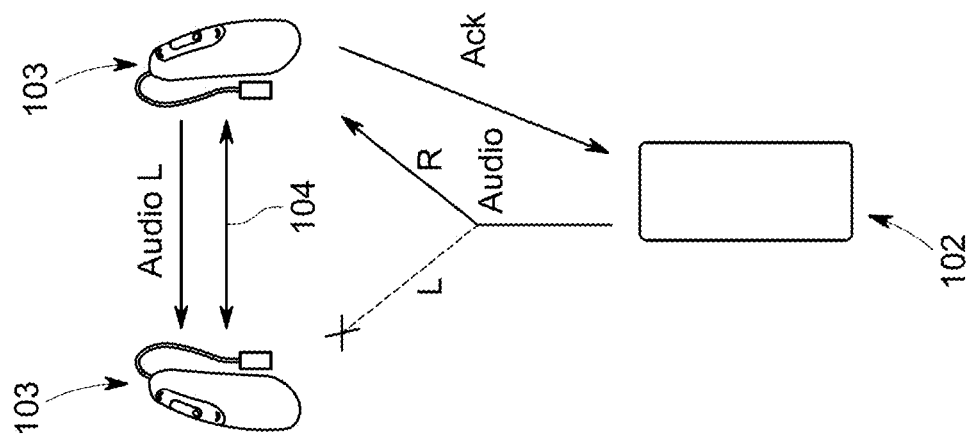
FIGS. 1A, 1B, and 1C are schematic diagrams of two hearing devices and a wireless communication device configured in a diversity scheme.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Example embodiments that incorporate one or more aspects of the apparatus and methodology are described and illustrated in the drawings. These illustrated examples are not intended to be a limitation on the present disclosure. For example, one or more aspects of the disclosed embodiments can be utilized in other embodiments and even other types of devices. Moreover, certain terminology is used herein for convenience only and is not to be taken as a limitation.

Within the context of the following description, hearing devices (such as hearing aids, hearing prostheses, cochlear implants, earphones, etc.) are specifically utilized by individuals to hear audio from another device or from the user's surroundings and may be used, for example in order to compensate hearing loss and/or improve hearing ability. A pair of hearing devices, one intended to be worn at the left and the other at the right ear of the user, which are linked to one another is referred to as a binaural hearing system. Different styles of hearing devices exist in the form of behind-the-ear (BTE), in-the-ear (ITE), completely-in-canal (CIC) types, as well as hybrid designs consisting of an outside-the-ear part and an in-the-ear part, the latter typically including a receiver (i.e., a miniature loudspeaker), therefore commonly termed receiver-in-the-ear (RITE), receiver-in-canal (MC), or canal-receiver-technology (CRT) hearing devices. Depending on the severity and/or cause of the user's hearing loss, other electro-mechanical output transducers, such as a bone-anchored vibrator, a direct acoustic cochlear simulator (DACS) or cochlear implant (CI) can be employed instead of a receiver. Other uses of hearing devices pertain to augmenting the hearing of normal hearing persons, for instance by means of noise suppression, to the provision of audio signals originating from remote sources, e.g., within the context of audio communication, and for hearing protection.

Hearing devices with multiple separate units, such as one intended to be worn at the left and the other at the right ear of the user, for example, allow communication between the two hearing device units, as well as communication with other devices, such as a mobile phone or a portable audio player. This communication may take place via a remote auxiliary unit, such as a hub, that acts as a communication relay. Advances in wireless technology allow direct wireless communications between a hearing device and audio sources, such as mobile phones (e.g., iPhone, Android, Blackberry, etc.), media players (e.g., iPod, MP3 player, etc.), computers (e.g., PC, Apple computer, etc.), and audio/video (A/V) receivers that can be part of a home entertainment or home theater system, for example.

Hearing devices can be used for wireless communications between hearing devices, to make and receive telephone calls to/from another user, and stream audio using an external audio source, such as mobile phone, using a bi-directional hands-free profile.

As a preliminary operation to begin streaming stereo audio, a hearing device can establish two wireless connections. First, a hearing device can establish a wireless connection with a wireless communication device based on a first wireless communication protocol. For example, a hearing device can use Bluetooth BR/EDR™ to establish a wireless connection with a wireless communication device after a pairing and/or an authentication operation. The wireless communication device can be considered the audio source because it can transmit an audio stream to a device (e.g., a hearing device). Second, the hearing device can establish a binaural link with a secondary hearing device worn on another ear. Using the binaural link, the hearing devices can implement a second wireless communication protocol to communicate information between the hearing devices (e.g., a proprietary wireless protocol for communicating between hearing aids).

The hearing device maintaining a wireless connection with the wireless communication device can be considered the primary hearing device and the second hearing device can be considered the secondary hearing device because the secondary hearing device can eavesdrop information communicated between the wireless communication device and the primary hearing device. Also, the secondary hearing device can receive other information (e.g., missed packet information or timing information) from the primary hearing device via the binaural link.

When the wireless communication device streams audio information to the primary hearing device, the primary and secondary hearing device can implement a diversity scheme. A diversity scheme enables assigning to either the primary and secondary hearing device the role of transmitting or receiving audio-related packets from and to the wireless communication device, and/or forwarding audio-related packets from one hearing device to another. For example, when implementing a diversity scheme, a primary hearing device can transmit audio-related packets to either the wireless communication device or the secondary hearing device. The audio-related packets can be audio packets or acknowledgements (ACK packets) to audio packets. Specifically, in the case of transmitting audio packets, the primary hearing device 103 (left hearing device) can forward an "audio R" packet to the secondary hearing device 103 (right hearing device) using a wireless connection 104 (also referred to as a binaural link between two hearing devices). Audio packets can also be voice captured by a microphone, voice for a telephone call, voice commands to applications stored on a mobile phone, etc., that can be transmitted, by the primary hearing device 103 and the secondary hearing device 103, and received, by the wireless communication device 102, through wireless links using wireless communication protocols, such as Bluetooth® or WiFi® (based on the IEEE 802.11 family of standards of the Institute of Electrical and Electronics Engineers), or the like, as well as other radio frequency (RF) communication protocols, for example. In the case of transmitting acknowledgements to audio packets, the primary hearing device 103 can transmit an ACK packet to the wireless communication device 102 that indicates it successfully received an audio-related packet or a signaling packet from a wireless communication device 102. Alternatively, a secondary hearing device 103 can transmit (i.e., forward) the audio packets to the primary hearing device 103 or transmit the ACK packet to the wireless communication device 102 indicating that it successfully received an audio-related packet. The primary and the secondary hearing device can communicate using the binaural link to determine which hearing device should send audio-related packets or it can be determined by a policy (e.g., timing) in the diversity scheme. The diversity scheme can ensure that only a single hearing device (not both) transmits audio-related packets towards the wireless communication device.

Also, the disclosed technology causes one of the hearing devices, such as the secondary hearing device, for example, to not acknowledge correctly received audio packets while the primary hearing device is assigned the role of transmitting audio-related packets towards the wireless communication device (even if the primary hearing device or the secondary hearing device correctly received the audio packets). This is generally referred to as switching roles of transmitting audio-related packets towards the wireless communication device because it prohibits at least one operation in the diversity scheme (e.g., the second hearing device transmitting acknowledgments). For example, if the wireless communication device is streaming audio to the primary hearing device and the secondary hearing device is eavesdropping the audio stream, and the two hearing devices are implementing a diversity scheme, the secondary hearing device will not transmit ACK packets in response to correctly received audio packets when the primary hearing device is assigned the role of transmitting audio-related packets towards the wireless communication device.

Also, as part of diversity suspension, the secondary hearing device ignores or never acknowledges a correctly received signaling packet from the wireless communication device. Rather, the primary hearing device is the only device that transmits a response to the signaling packet from the wireless communication device after the primary hearing device has correctly received the signaling packet from the wireless communication device. This can reduce requiring binaural forwarding of signaling packets from the secondary hearing device to the primary hearing device, which can be considered a complex operation.

The disclosed diversity scheme reduces interruptions, signal distortions, and signaling traffic because less bandwidth is used and wireless connections with better connectivity are used.

Figure 1B:
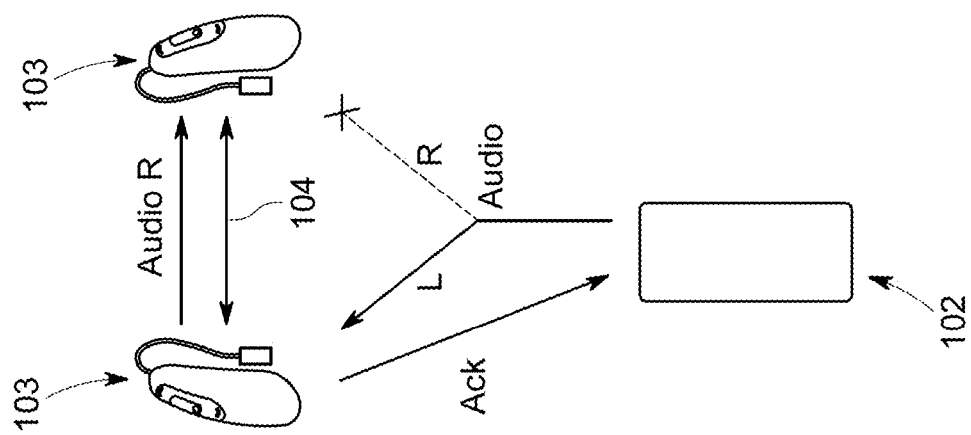
Figure 1A:
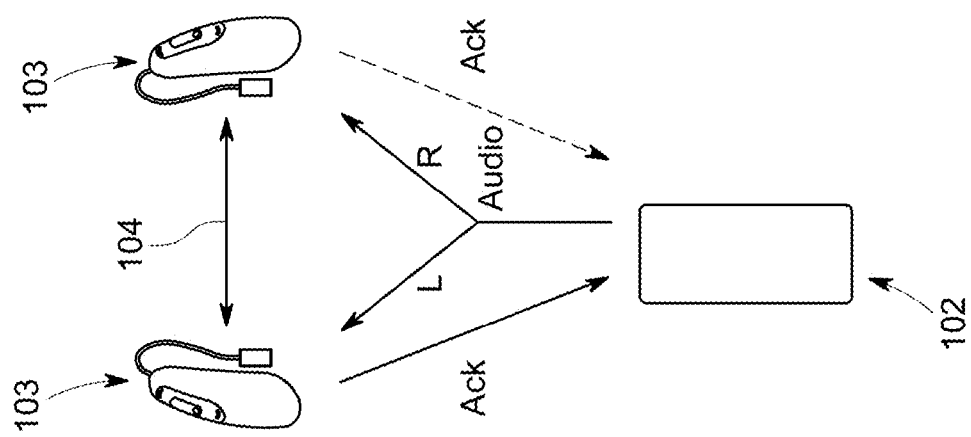

FIGS. 1A, 1B, and 1C illustrate two hearing devices and a wireless communication device configured to implement a diversity scheme with a role switch. As shown by double-headed bold arrows in FIG. 1, the wireless communication devices 102 and the hearing devices 103 can communicate wirelessly, e.g., each wireless communication device 102 can communicate with each hearing device 103 and each hearing device 103 can communicate with the other hearing device 103. Wireless communication can include using a wireless communication protocol such as Bluetooth BR/EDR™, Bluetooth Low Energy™ a proprietary communication (e.g., binaural communication protocol between hearing aids or bimodal communication protocol between a hearing aid and hearing device), ZigBee™, Wi-Fi™, or an Industry of Electrical and Electronic Engineers (IEEE) wireless communication standard (e.g., 802.11).

A diversity scheme generally enables hearing devices receiving audio-related and signaling packet to vary or change how they transmit or receive ACK packets. With a diversity scheme, hearing devices can avoid audio interruptions because at least one hearing device should receive an audio packet correctly and transmit an ACK packet to the wireless communication device 102. Also, because the hearing device 103 that correctly receives the audio or signaling packet transmits an ACK packet in a diversity scheme, it increases probability that the wireless communication device receives the corresponding acknowledgment packet because it is likely there is a good connection and/or signaling path between the wireless communication device and the hearing device. FIGS. 1A, 1B, and 1C illustrate different aspects of implementing a diversity scheme with two hearing devices and a wireless communication device.

In FIG. 1A, each hearing device 103 can transmit an ACK packet. An ACK packet is a signal that is transmitted between the hearing device 103 and the wireless communication device 102 that acknowledges reception of a packet of information (e.g., as part of Bluetooth BR/EDR™). The ACK packet can be part of a packet header (see FIG. 3). Specifically, a hearing device 103 can transmit an ACK packet that indicates it received an audio packet or signaling packet correctly from the wireless communication device 102. For example, a primary hearing device wirelessly linked to the wireless communication device can transmit an ACK packet or a secondary hearing device 103 eavesdrops a stream and transmits an ACK packet. If the wireless communication device 102 receives the ACK packet, it can use this information to transmit new (e.g., the next packet) information or continue to stream more information.

In contrast to FIG. 1A where both hearing devices 103 can transmit ACK packets in response to successfully receiving an audio packet, in FIG. 1B, only the primary hearing device 103 successfully receives an audio packet and transmits an ACK packet. Here, the primary hearing device 103 transmits or forwards received audio packet information to the secondary hearing device 103. Specifically, as shown in FIG. 1B, the primary hearing device 103 (left hearing device) forwards an "audio R" packet to the secondary hearing device 103 (right hearing device) using a wireless connection 104 (also referred to as a binaural link between the two hearing devices). The secondary hearing device 103 does not transmit an ACK packet.

In contrast to FIG. 1B where only the primary hearing device 103 successfully receives an audio packet from the wireless communication device 102, in FIG. 1C, only the secondary hearing device 103 successfully receives an audio packet from the wireless communication device 102 and transmits an ACK packet to the wireless communication device 102. The secondary hearing device also forwards an "audio L" packet to the primary hearing device 103 using the wireless connection 104.

The wireless communication devices 102 can be computing devices that may be configured to wirelessly communicate. Wireless communication includes wirelessly transmitting information, wirelessly receiving information, or both. The wireless communication devices 102 shown in FIG. 1 can include computers (e.g., desktop or laptop), televisions (TVs) or components in communication with television (e.g., TV streamer), a car audio system or circuitry within the car, a mobile device (e.g., smartphone), tablet, remote control, an accessory electronic device, a wireless speaker, or watch, for example. It should be noted that the hearing device 103 can also be a wireless communication device 102, but the hearing device 103 can be configured to provide audio to a user in addition to wirelessly communicating with other devices.

Some example hearing devices 103 can include hearing aids, headphones, earphones, assistive listening devices, or any combination thereof. Hearing devices can include both prescription devices and non-prescription devices configured to be worn on or near a human head. As an example of a hearing device 103, a hearing aid is a device that provides amplification, attenuation, or frequency modification of audio signals to compensate for hearing loss or difficulty. Some example hearing aids include a Behind-the-Ear (BTE), Receiver-in-the-Canal (MC), In-the-Ear (ITE), Completely-in-the-Canal (CIC), or Invisible-in-the-Canal (IIC) hearing aid or a cochlear implant (where a cochlear implant includes a device part and an implant part). Depending on the severity and/or cause of the user's hearing loss, other electro-mechanical output transducers, such as a bone-anchored vibrator, a direct acoustic cochlear simulator (DACS) or cochlear implant (CI) can be employed instead of a receiver. Other uses of hearing devices pertain to augmenting the hearing of normal hearing persons, for instance by means of noise suppression, to the provision of audio signals originating from remote sources, e.g., within the context of audio communication, and for hearing protection.

Hearing devices with multiple separate units, such as one intended to be worn at the left and the other at the right ear of the user, for example, allow communication between the two hearing device units, as well as communication with other devices, such as a mobile phone or a portable audio player. This communication may take place via a remote auxiliary unit, such as a hub, that acts as a communication relay. Advances in wireless technology allow direct wireless communications between a hearing device and wireless communication devices, such as mobile phones (e.g., smartphone, such as iPhone, Android, Blackberry, etc.), Digital Enhanced Cordless Telecommunications ("DECT") phones, landline phones, tablets, media players (e.g., iPod, MP3 player, etc.), computers (e.g., desktop or laptop, PC, Apple computer, etc.), audio/video (A/V) receivers that can be part of a home entertainment or home theater system, for example, a car audio system or circuitry within the car, remote control, an accessory electronic device, a wireless speaker, or a smart watch.

Figure 2:
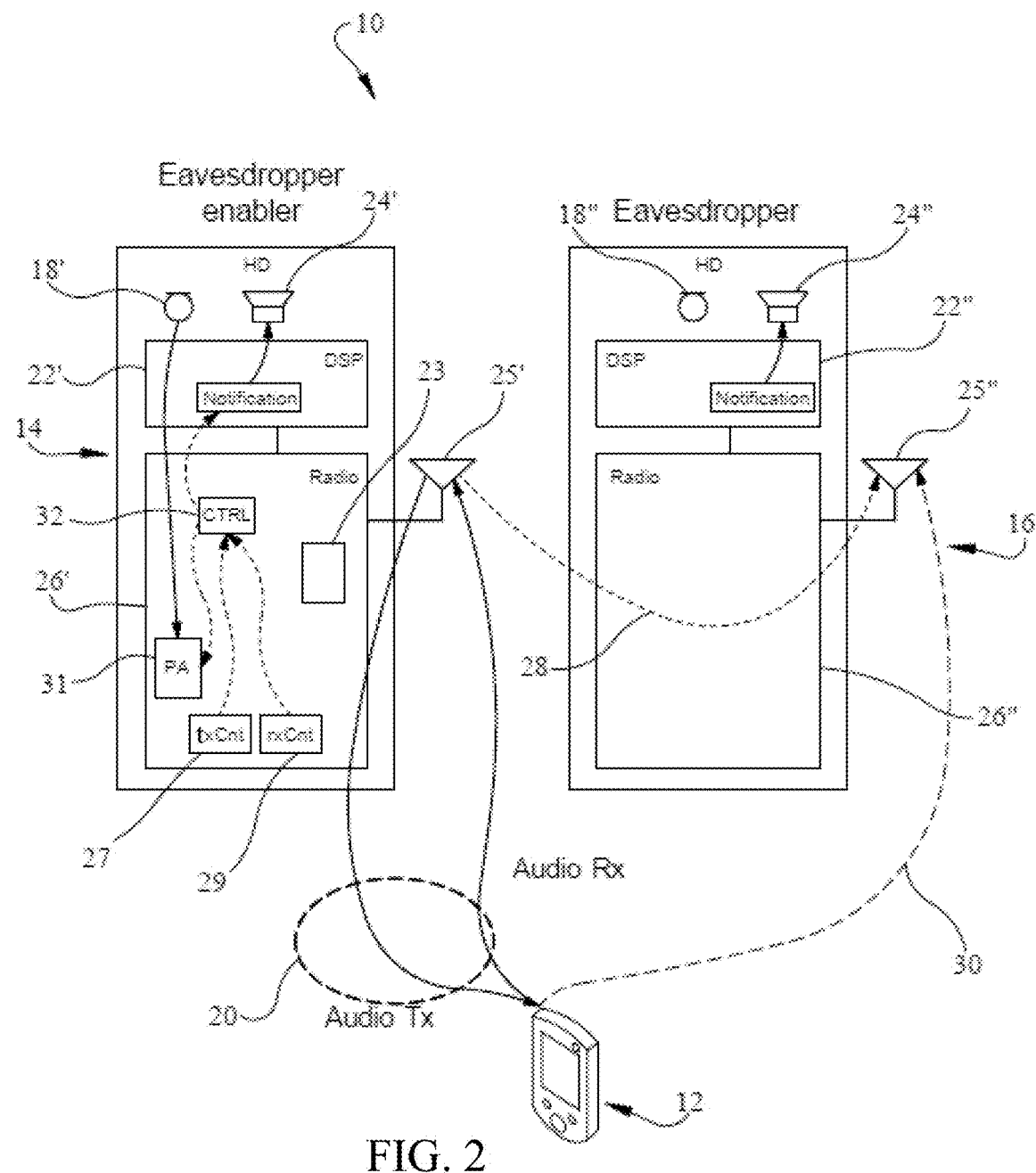
FIG. 2 is a schematic diagram illustrating a hearing system with a wireless communication device and an eavesdropper enabler hearing device (also called participant hearing device) and an eavesdropper hearing device, according to an embodiment.

An example schematic diagram of such wireless communications system is illustrated in FIG. 2. The wireless communications system 10 can include a wireless communication device 12 (illustrated as a mobile phone in FIG. 2, but not limited thereto), a first hearing device 14, and a second hearing device 16. However, embodiments are not limited thereto and other configurations are contemplated. For example, the wireless communications system 10 can include a wireless communication device 12 and only one hearing device. In operation, the wireless communication device 12 can wirelessly transmit audio packets, which can be received by the first hearing device 14 and the second hearing device 16. The audio packets can be transmitted and received through wireless links using wireless communication protocols, such as Bluetooth or Wi-Fi® (based on the IEEE 802.11 family of standards of the Institute of Electrical and Electronics Engineers), or the like, as well as other radio frequency (RF) communication protocols, for example. Among such point-to-point wireless communications are protocols that conform to the Bluetooth specification promulgated by the Bluetooth Special Interest Group of Bellevue, Wash. The Bluetooth Core Specification specifies both the Bluetooth Classic variant of Bluetooth, also known as Bluetooth Basic Rate/Enhanced Data Rate™ (Bluetooth BR/EDR™), as well as Bluetooth Low Energy variant of Bluetooth, also known as Bluetooth LE, or BLE. Advances in integrated chip design have made it possible to develop a chip that supports both Bluetooth Classic and Bluetooth Low Energy and that has a size and a power consumption performance that is suitable for the capabilities of hearing devices. Because Bluetooth BR/EDR™ is generally a point-to-point communication, it may be desirable for one of two hearing devices worn by a user to eavesdrop an audio stream to hear audio in stereo while the other hearing device maintains a point-to-point Bluetooth BR/EDR™ connection. Specifically, a primary hearing device may establish a wireless connection with a wireless communication device and begin streaming music, and a secondary audio device can eavesdrop the audio stream (e.g., without a wireless connection to the wireless communication device). The primary hearing device can receive audio packets for the left stereo channel and the secondary hearing device can eavesdrop audio packets for the right stereo channel (or vice versa). Accordingly, A2DP eavesdropping allows the hearing device user to listen to an audio stream in stereo despite Bluetooth BR/EDR™ being a point-to-point connection.

In the Bluetooth system, when a hearing device is connected to a mobile phone, it is up to the mobile phone to control the transmit power of the hearing device. If the reception power is too low, the mobile phone asks, via the Bluetooth protocol, to increase the transmit power of the hearing device. If the reception power is too high, the mobile phone asks, via the Bluetooth protocol, to decrease the transmit power of the hearing device.

The Bluetooth system uses a closed loop power control. Each side can ask the other side to increase or decrease the transmitted power, with the goal to receive the radio signal in the best power zone (e.g., not to weak and not too strong).

The first hearing device 14 and the second hearing device 16 can be electro-acoustic transducers configured to convert audio information into sound. Such electro-acoustic transducers can include but are not limited to earphones, ear buds, hearing aids, speakers, headphones, etc., for example. The first hearing device 14 may be configured as a left channel speaker for a stereo channel and the second hearing device 16 may be configured as a right channel speaker for a stereo channel, or vice-versa.

As shown in FIG. 2, each of the first hearing device 14 and the second hearing device 16 can include an input microphone system 18', 18" configured to capture an audio signal and convert the audio signal into an electrical input signal. Although the microphone system shown in FIG. 2 includes only one input microphone 18', 18", the microphone system can include more than one input microphone. The microphone 18', 18" may be directional, i.e., may pick up most sounds in front a person wearing the microphone, or omni-directional, i.e., may pick up sounds from all directions. In addition to the input microphone 18', 18", further receiving means for receiving signals may be present, such as a telecoil receiver, a receiving unit including an antenna for receiving wirelessly transmitted signals, etc. For example, a streamed audio input signal (such as a phone call or music) can be received from a streaming input source, such as the wireless communication device 12, for example, by a wireless connection, such as wireless point-to-point link 20, for example.

The electrical input signals obtained from the input microphone 18', 18" can be processed by a signal processor 22', 22" that can convert the electrical input signals into digital signals that can be processed further to obtain an electrical output signal. A desired electrical input signal can be the electrical input signal obtained by the input microphone 18', 18", the streamed audio input signal, or a mix of both input signals. The electrical output signal can be converted into an acoustic output signal by a receiver 24', 24" (also known as a "speaker") and can be emitted into the remaining volume between the user's eardrum and the earpiece or the in-the-ear-canal-component of the hearing device.

The signal processor 22', 22" may be a single digital signal processor or may be made up of different, potentially distributed processor units, preferably including at least one digital signal processor unit. The signal processor 22', 22" can include one or more of a microprocessor, a microcontroller, a digital signal processor (DSP), an application specific integrated circuit (ASIC), a field-programmable gate array (FPGA), discrete logic circuitry, or the like, appropriately programmed with software and/or computer code, or a combination of special purpose hardware and programmable circuitry. The signal processor 22', 22" may be further adapted to differentiate sounds, such as speech and background noise, and process the sounds differently for a seamless hearing experience. The signal processor 22', 22" can further support cancellation of feedback or noise from wind, ambient disturbances, etc.

The signal processor 22', 22" can further include memory (not shown in FIG. 2) and may store tables with predetermined values, ranges, and thresholds, as well as program instructions that may cause the signal processor 22', 22" to access the memory, execute the program instructions, and provide the functionality ascribed to it herein. The memory may include one or more volatile, non-volatile, magnetic, optical, or electrical media, such as read-only memory (ROM), random access memory (RAM), electrically-erasable programmable ROM (EEPROM), flash memory, or the like. The signal processor 22', 22" can further include one or more analog-to-digital (A/D) and digital-to-analog (D/A) converters for converting various analog inputs to the signal processor 22', 22", such as analog input from the microphone 18', 18", for example, in digital signals and for converting various digital outputs from the signal processor 22', 22" to analog signals representing audible sound data which can be applied to the speaker 24', 24", for example.

Each of the first hearing device 14 and the second hearing device 16 can be configured to wirelessly receive audio or other signals from each other, from the wireless communication device 12, or from another device, component or system, such as a remote hearing device controller, a hearing loop system, an audio link device, or a streaming device, for example. Each of the first hearing device 14 and the second hearing device 16 can include a wireless communication unit, such as a transceiver 26', 26" configured to receive and optionally to transmit wireless signals to other devices. For example, each of the first hearing device 14 and the second hearing device 16 may receive wireless audio signals and/or control signals from a wireless communication device via an antenna 25', 25", and convey them to the signal processor 22', 22" or to each other. In certain embodiments, the transceiver 26', 26" may be a part of the signal processor 22', 22". Specifically, the signal processor 22', 22" can employ a Bluetooth receiver, an audio codec that provides the audio signal conveyed by a wireless communication device, such as the wireless communication device 12, for example, in digitized form, and a decoder that decodes the digitized audio signal. Alternatively, the transceiver 26', 26" may include its own Bluetooth on-board signal processor 23. As illustrated in FIG. 2, the transceiver 26' can include a transmit counter (txCnt) 27 and a receive counter (rxCnt) 29, which may count how many attempts have occurred to transmit and receive an audio packet between the first hearing device 14 and the wireless communication device. The transceiver 26' can also include a power amplifier 31 that may be configured to amplify the signal from the microphone 18'. The transceiver 26' can further include a controller 32 that can receive the respective counts from the transmit counter (txCnt) and the receive counter (rxCnt), send a control signal to the amplifier to amplify an audio signal, or send notifications to the first hearing device 14 and the second hearing device 16 regarding the quality of the wireless link 20 based on the counts from the transmit counter (txCnt) and the receive counter (rxCnt), as described below. The controller 32 may be a single digital signal processor or may include one or more of a microprocessor, a microcontroller, a digital signal processor (DSP), an application specific integrated circuit (ASIC), a field-programmable gate array (FPGA), discrete logic circuitry, a memory, or the like. The transceiver 26" can have a similar configuration, particularly if the roles of the hearings devices 14 and 16 are reversed, and the second hearing device 16 performs the functions of a participant/eavesdropper enabler.

Figure 3:
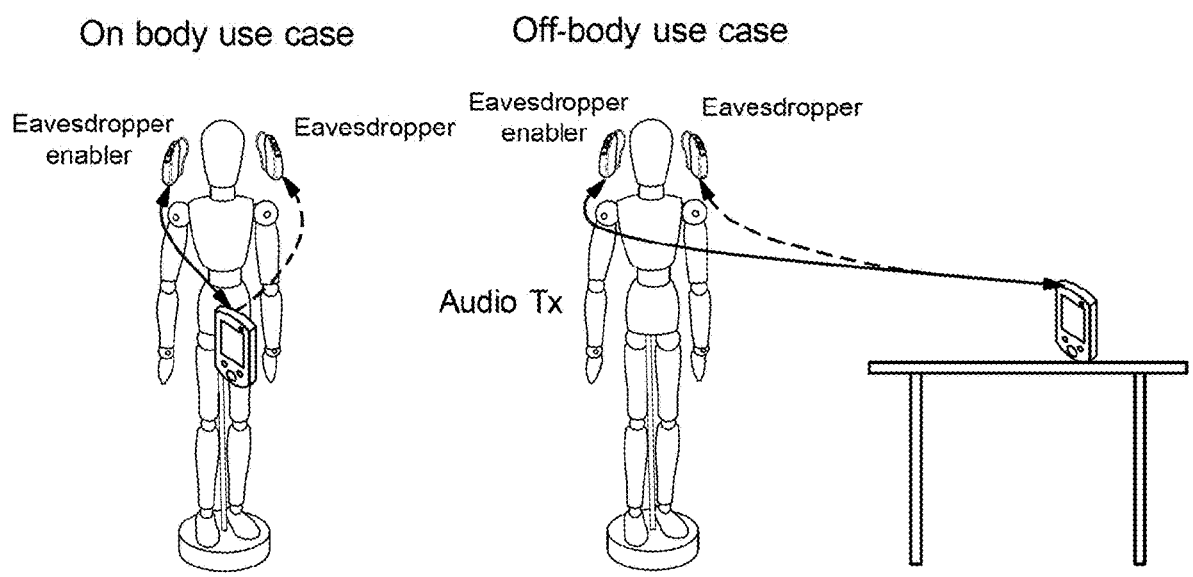
FIG. 3 is a schematic diagram illustrating an on-body (front or back pocket) and off-body use scenarios of the hearing system of FIG. 2.
Figure 4:
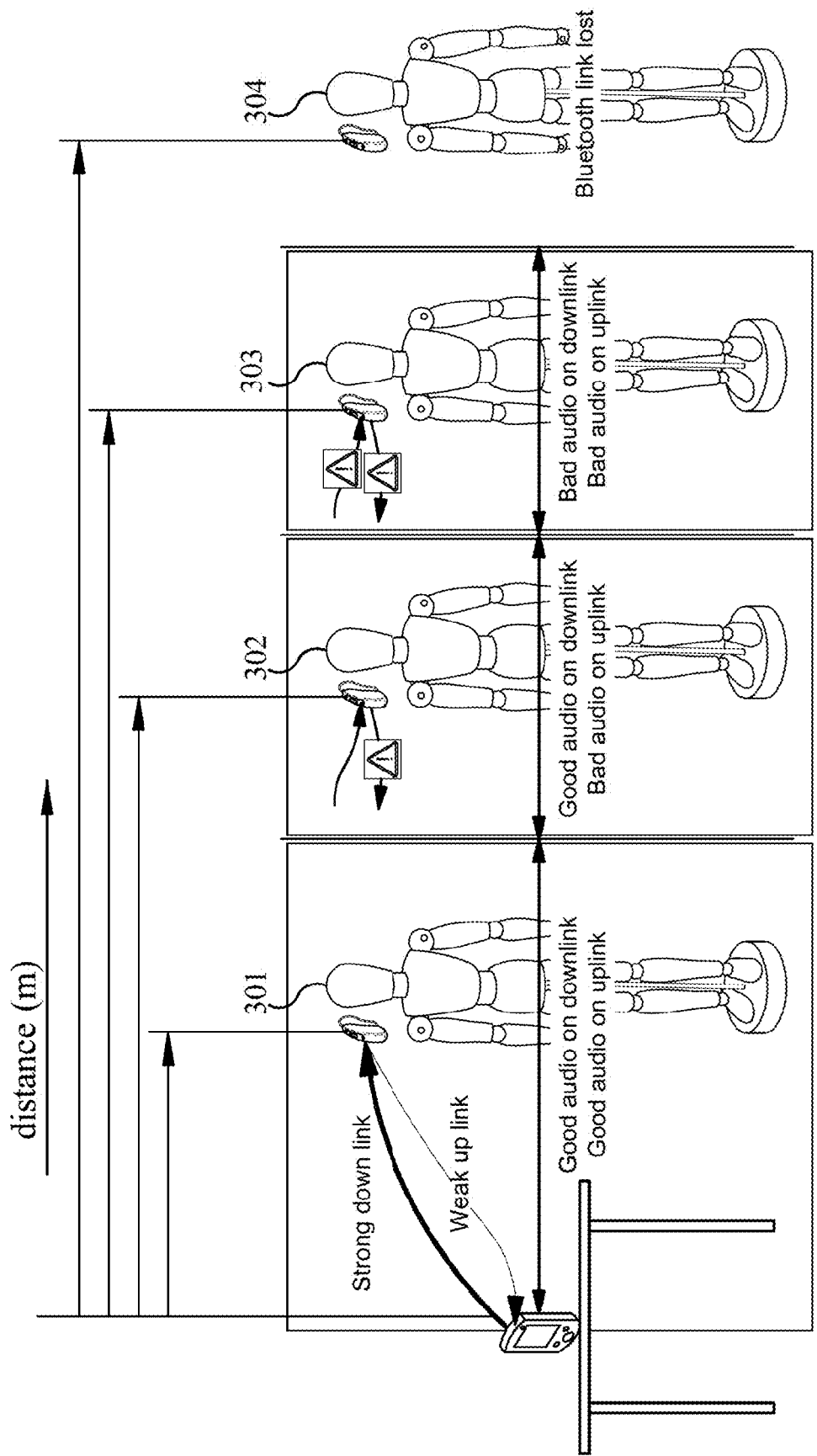
FIG. 4 is a schematic diagram illustrating usage range zones with different quality of the audio on the uplink and downlink of the hearing system of FIG. 2, according to an embodiment.

Modern hearing devices can be used to make and receive telephone calls and stream audio using a wireless communication device, such as mobile phone, via a wireless link, using a bi-directional hands-free profile. This link can also be used for voice communication with a digital assistant on the mobile phone. The mobile phone can be worn by the user on-body (e.g., in a front pocket, back-pocket, or in a bag), or off-body (e.g., on a table or desk), as illustrated in FIG. 3, for example. A hearing device usually transmits at a power of 0 dBm. At the same time, current mobile phones may transmit at a power of up to 20 dBm and the power level increases with each new generation of mobile phones. Because the transmit powers of the hearing device and the mobile phone are different (e.g., asymmetric), when the distance between the hearing device and the mobile phone exceeds a certain range, the wireless link quality can deteriorate and the quality of the transmitted audio can deteriorate as a result. For example, as illustrated in FIG. 4, certain range zones can result in good audio for both the uplink (e.g., the wireless link from the hearing device to the mobile phone) and downlink (e.g., the wireless link from the mobile phone to the hearing device) (user 301), in good audio on the downlink only and bad audio on the uplink (user 302), and with bad audio on both the uplink and downlink (user 303). These differences between the uplink and the downlink in the situations shown for user 302, for example, can cause wireless link asymmetry that can result in bad audio on the uplink and/or the downlink (i.e., on the bad wireless link). In the worst case scenario, the Bluetooth link may be completely lost (user 304).

Figure 5A:
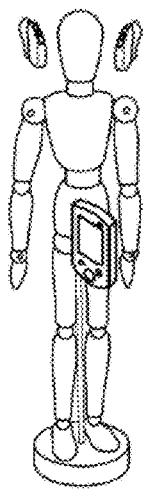
FIGS. 5A-5C are schematic diagrams illustrating quality of the audio and usage range zones depending on the location of the hearing system of FIG. 2, according to an embodiment.
Figure 5B:
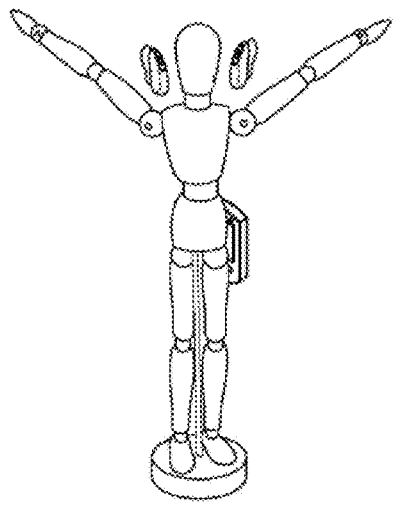
Figure 5C:
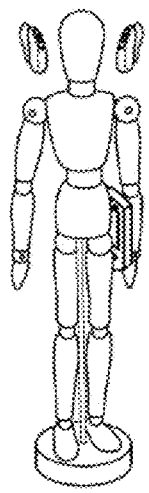

In addition, even if mobile phone is worn by the user on-body, the location of the mobile phone can still affect the wireless link, as illustrated in FIGS. 5A-5C. For example, when the mobile phone is worn by the user in the front pocket, the link quality remains acceptable (FIG. 5A). When the mobile phone is worn by the user in the back pocket, the link quality depends on the position of the user's arms. Specifically, when the mobile phone is worn by the user in the back pocket and the user's arms are up or away from the user's body, the link quality remains acceptable (FIG. 5B). However, when the mobile phone is worn by the user in the back pocket and the user's arms are down or close to the user's body, the link quality deteriorates (FIG. 5C). FIG. 5C depicts an example of a situation that might benefit from diversity with role switch, where the roles od the primary hearing device and the secondary hearing device can be switched, to assign the role of transmitting audio-related packets towards the wireless communication device to the hearing device with better quality of the wireless link to the wireless communication device.

Figure 6:
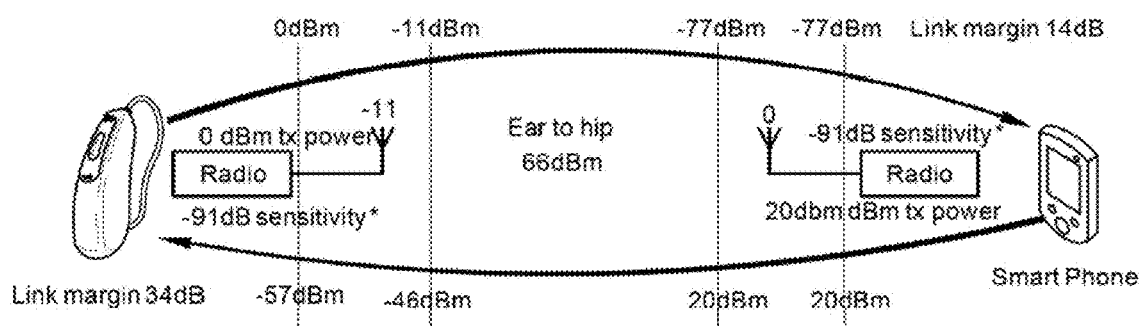
FIG. 6 is a schematic diagram illustrating audio link asymmetry of the hearing system of FIG. 2, according to an embodiment.

Some hearing devices are susceptible to wireless link asymmetry due to the different (e.g., asymmetric) transmit powers of the hearing device and the mobile phone, when the distance between the hearing device and the mobile phone exceeds a certain range. The amount of link asymmetry can be calculated with the following formula: A=(PhoneTxPower−HearingAidSensitivity)−(HearingAid-TxPower−PhoneSensitivity)=(20−(−91))−(0−(−91))=20, where the value −91 dBm for the sensitivity of the hearing aid and of the mobile phone is a typical sensitivity for Bluetooth chips. The wireless link asymmetry is illustrated in FIG. 6. The hearing system described herein can control automatically (e.g., without manual intervention by the user) any asymmetry of the wireless links between the hearing device and the wireless communication device, thereby improving the audio quality.

Turning back to FIG. 2, it may be desirable to transmit the sound coming from the mobile phone 12 into both ears of the user. The first (e.g., left) hearing device 14 can be connected to the wireless communication device 12 via the wireless point-to-point link 20, which can conform to the Bluetooth protocol. A separate Bluetooth or a proprietary binaural wireless link 28 may be formed between the first hearing device 14 and the second hearing device 16 for network management purposes and/or to coordinate actions between the first hearing device 14 and the second hearing device 16 concerning audio received from the wireless communication device 12, for example. The first hearing device 14 can receive audio packets directly from the wireless communication device 12 via the wireless link 20. The second (e.g., right) hearing device 16 can be configured to eavesdrop on (that is, can listen in on or observe) the Bluetooth link 20 between the mobile phone 12 and the first hearing device 14 to also receive the audio packets sent from the wireless communication device 12 by picking up the audio sent by the mobile phone 12 to the first hearing device 14 and playing back this sound. For example, the second hearing device 16 can be configured to eavesdrop on the Bluetooth link 20 between the mobile phone 12 and the first hearing device 14 via a communication link 30. In other words, the first hearing device 14 can be configured as a participant or an eavesdropper enabler (EDE) and the second hearing device 16 can be configured as an eavesdropper (ED). The eavesdropper and participant roles are not necessarily limited to the second hearing device 16 and the first hearing device 14, as illustrated in FIG. 2, and can be reversed. For example, the first (left) hearing device 14 could be the eavesdropper and the second (right) hearing device 16 could be the participant.

The Hands-Free Profile ("HFP") and the Advanced Audio Distribution Profile ("A2DP") of the Bluetooth specification may both be utilized for the point-to-point links 20 and 28. When HFP is utilized, the wireless communication device 12 can send incoming audio to the first hearing device 14. The first hearing device 14 renders the received incoming audio. The second hearing device 16 can eavesdrop the mono (i.e., monaural) incoming audio link and also renders the received incoming audio. When A2DP is utilized, the first hearing device 14 receives a stereo (i.e., stereophonic) signal and renders only the left audio channel. The second hearing device 16 can eavesdrop on the stereo signal and render the right audio channel.

The first hearing device 14 can be configured to transmit an outgoing audio packet (e.g., voice for a telephone call or voice commands to applications stored on the mobile phone 12) to the mobile phone 12. The outgoing audio packet can be transmitted via the wireless point-to-point link 20, which conforms to a wireless communication protocol such as Bluetooth BR/EDR™, Bluetooth Low Energy™, a proprietary communication (e.g., binaural communication protocol between hearing aids or bimodal communication protocol between a hearing aid and hearing device), ZigBee™, Wi-Fi™, or an Industry of Electrical and Electronic Engineers (IEEE) wireless communication standard (e.g., 802.11), for example. The second hearing device 16 can be similarly configured to transmit an outgoing audio packet (e.g., voice for a telephone call or voice commands to applications stored on the mobile phone 12) to the mobile phone 12, over another wireless link similar to the wireless link 20. The wireless link 20 may also be configured for bi-directional communications allowing transmission and receipt of audio packets, as well as transmission and receipt of acknowledgements (ACK) by the hearing devices 14, 16 that an audio packet was successfully received, for example. The wireless link 20 may further be configured for bi-directional communications between the first hearing device 14 and the mobile phone 12, allowing not only transmission and receipt of audio packets between the first hearing device 14 and the wireless communication device 12, but also acknowledgements by the mobile phone 12 that an audio packet from the first hearing device 14 was successfully received. The bi-directional link 20 can minimize the number of audio packet re-transmissions when an audio packet has been received and no retransmission is necessary. When an audio packet from the wireless communication device 12 is not received or is received corrupted by the first hearing device 14, the first hearing device 14 can transmit an error signal across the wireless link 20 to the wireless communication device 12 to request retransmission of the audio packet. Such an error signal is called a negative acknowledge (NAK) in the Bluetooth specification, in opposition to the positive acknowledge (ACK). When an audio packet from the first hearing device 14 is not received or is received corrupted by the wireless communication device 12, the wireless communication device 12 can transmit an error signal across the wireless link 20 to the first hearing device 14 to request retransmission of the audio packet. When an audio packet is not received or is received corrupted by the second hearing device 16, the second hearing device 16 can transmit an error signal via the separate wireless link 28 to the first hearing device 14 to be forwarded to the wireless communication device across the wireless link 20 requesting retransmission of the audio packet.

When an audio packet is not received or is received corrupted by the mobile phone 12, the mobile phone 12 can transmit an error signal across the wireless link 20 to the first hearing device 14 to request retransmission of the audio packet.

Figure 7:
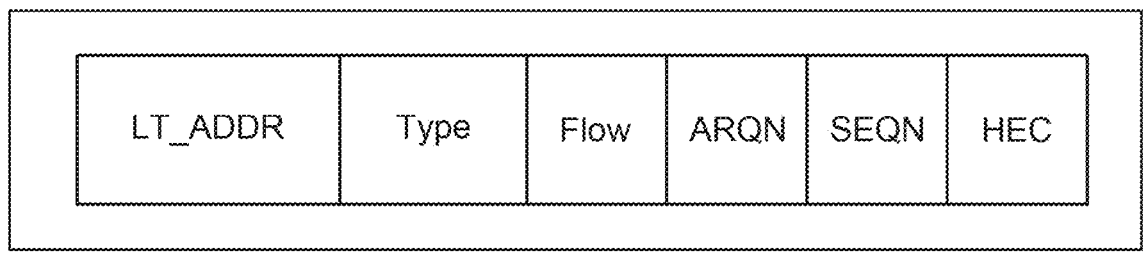
FIG. 7 is a schematic diagram of a packet header used in a wireless communication protocol, according to an embodiment.

FIG. 7 is a schematic diagram for a signaling packet header used in a wireless communication protocol (e.g., Bluetooth BR/EDR™). The packet header can be used in signaling communication. For example, signaling communication occurs during A2DP communication between a wireless communication device and a hearing device (e.g., bidirectional). Two levels of signaling are common: (1) Link Manager Protocol (LMP) communication and (2) Logical Link Control and Adaptation Protocol (L2CAP). LMP generally refers to updated channel maps, periodic channel classification packets, requests to increase or decrease transmit power. L2CAP signaling generally refers to signaling for A2DP (e.g., play or pause stream) or notification (e.g., phone call notifications in Hands-Free-Profile). As A2DP audio packets are also transmitted using L2CAP, the destination Channel ID (CID) field within the L2CAP packet informs whether an L2CAP packet carries A2DP audio or signaling. For example, an L2CAP packet contains A2DP audio and does not contain signal if the content of its CID field corresponds to the destination channel endpoint that has been configured for A2DP audio packets when the A2DP connection has been established.

In the context of HFP, audio-related packets are defined as eSCO audio packets.

Two fields of the header can be used for traffic control in either direction of Bluetooth BR/EDR™. One field is an automatic repeat request number (ARQN) bit in the header packet, which a device can use to acknowledge reception of a valid packet with data from another device by setting the ARQN. This ARQN field can be a "not acknowledge" (NAK), which means that no acknowledgment is being sent, or ACK, which means that an acknowledgment is being sent. A device receiving a header can use the ARQN information to determine whether a packet was received successfully (e.g., based on receiving an "1" in the ARQN field) or whether an acknowledgment was not necessary or the packet was not received correctly.

Another field for signaling traffic in the header is the sequence number (SEQN), which is generally a 1-bit number that is toggled for consecutive packets that carry a payload. For example, an audio packet can be sent as "0" SEQN meaning it is a first packet and then another audio packet can be sent as a "1" SEQN because it is the next packet with payload. A device receiving packets with this header can use the SEQN number to filter out duplicates. For example, if a hearing device correctly receives two consecutive packets that have a "0" for SEQN, it can determine that the second packet is a duplicate of the first one and discard it.

When interpreting a packet header in A2DP, a hearing device may need to use the same SEQN number for transmitting a packet until an acknowledgment is received from a wireless communication device (e.g., audio source). Also, the same SEQN number may need to be used in the communication to the wireless communication device even after reception of an ACK packet and may need to be used for other communications. Accordingly, the SEQN being updated ensures correct wireless protocol functionality. Without an updated or accurate SEQN number, a hearing device user may experience suboptimal performance such as unexpected disconnections because the wireless communication device may filter out correctly received packets if the received SEQN number is not correct or updated.

Also as part of the signaling packet header, the Header Error Check (HEC) is an 8-bit number that is an integrity check value calculated from other bits of the header. The header also includes other information such as Logical Transport Active Member Address (LT_ADDR), which refers to the address of the active slave to which the packet is directed or from which it is being sent. An address of zero is reserved for a "broadcast message" message to all active slave devices. Flow control (FLOW) relates to flow control over the ACL (asynchronous connection-less) logical transport (e.g., 0=stop and 1=go) and type code (TYPE) identifies the type of packet, which depends on whether the logical transport is ACL and SCO (synchronous Connection Oriented). A device receiving the packet header information can use it to update, control, or monitor traffic signaling wireless communications. A device can also generate a packet header when transmitting a packet (e.g., signaling or audio packet).

Although not shown in FIG. 7, the wireless communication device or the hearing device transmits audio packets or signaling packets. These packets can include a channel identification (CID), which can be a two-bit number. The CID can be used by the wireless communication device 102 or the hearing device 103 to determine what type of information the packet is associated with (e.g., CID can be associated with a hands-free profile and another CID can be associated with a A2DP). In some implementations, the hearing device or wireless communication device can use CID to implement full diversity. For example, the hearing device may implement full diversity for packets with a CID related to A2DP, but the hearing device may not implement full diversity for packets with a CID associated with the hands-free profile (or another profile). If the device determines that a CID is associated with A2DP, it can then distinguish between packets related to audio (i.e., audio-related packets) and packets related to signaling.

Figure 8:
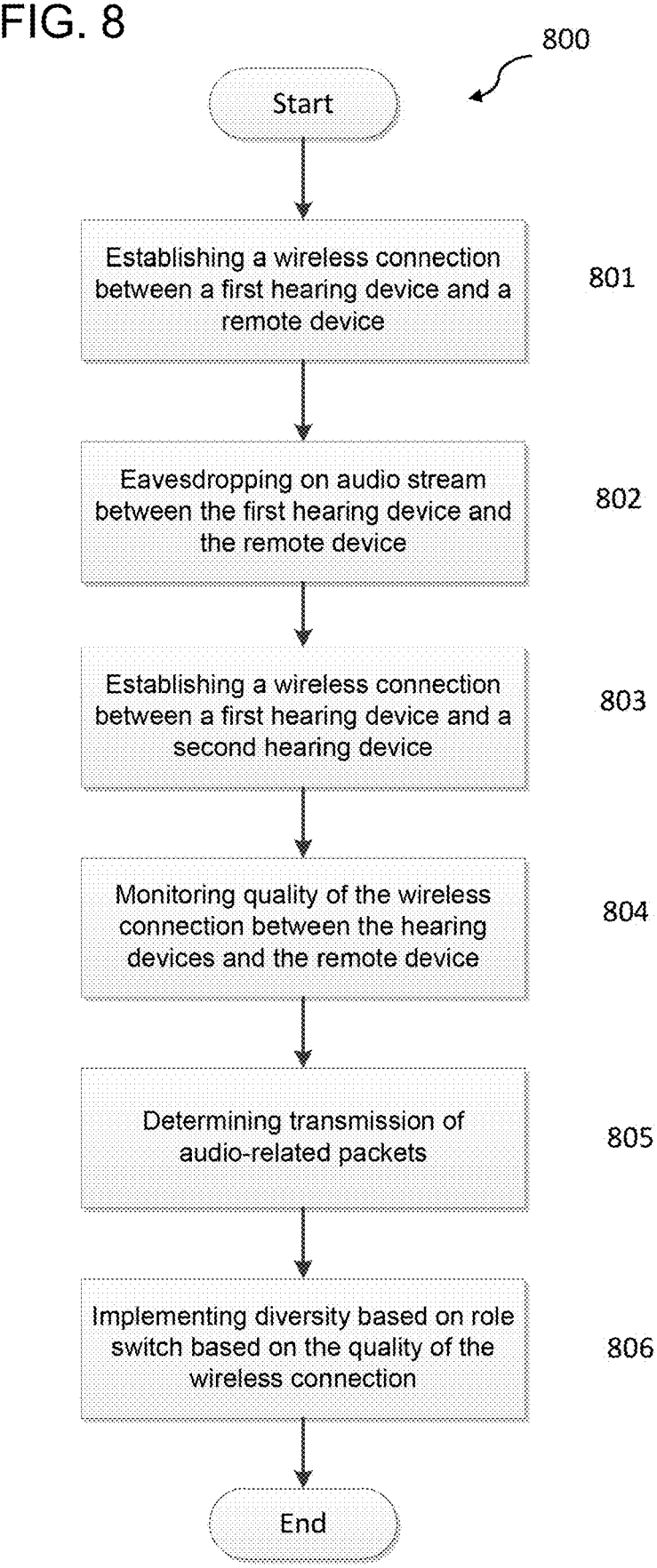
FIG. 8 is a simplified flowchart illustrating a process for implementing a diversity scheme.

FIG. 8 illustrates a simplified block flow diagram for a process 800 for implementing a diversity scheme. In some implementations, the process 800 can be carried out by a hearing device (e.g., hearing device 103, FIGS. 1A-1C) or can be carried out by a wireless communication device (e.g., wireless communication device 102, FIGS. 1A-1C). Part or all of the process 800 may be carried out on more than one device (e.g., two hearing devices can perform the process or a wireless communication and two hearing devices can perform the operations of the process 800). The process 800 begins with a wireless connection operation 801 and continues to eavesdropping operation 802. As disclosed in more detail, some operations of the process 800 may be repeated or performed out of order.

At wireless connection operation 801, a hearing device 103 wirelessly connects with a wireless communication device 102. The hearing device 103 can wirelessly connect with a wireless communication device 102 using a Bluetooth link or another wireless communication protocol. The hearing device 103 can also perform pairing and authentication operations to secure the wireless connection between the hearing device and the wireless communication device. The hearing device 103 with the wireless connection to the wireless communication device 102 can be referred to as the "primary" device, the "master device", or the "first" hearing device. The other hearing device 103 can be referred to as the "secondary", "slave", or "second" hearing device. The wireless connection between the hearing devices 103 can be a binaural connection, which means the two hearing devices 103 can communicate regarding providing hearing to the hearing device user. The wireless protocol used to connect the hearing device 103 and the wireless communication device 102 can be different than the wireless protocol used to connect the two hearing devices 103. More information regarding the wireless connection between the wireless communication device 102 and the hearing devices 103 can be found in PCT/EP2018/081139 filed Nov. 14, 2018, and titled "Operating More Than One Wireless Communication Protocol with a Coexistence Window," and PCT/EP2018/081136 filed on Nov. 14, 2018, and titled "Operating More Than One Wireless Protocol with a Hearing Device," both of which are incorporated herein by reference for their entireties.

At eavesdropping operation 802, a second hearing device (e.g., a slave or secondary hearing device) eavesdrops an audio stream between the first hearing device and the wireless communication device. Specifically, a wireless communication device can transmit a stereo audio stream of music or phone call audio using A2DP, and the second hearing device can eavesdrop audio packets and/or signaling packet information from the audio stream. If the second hearing device is a left hearing device, it can eavesdrop left audio packet information; and if the second hearing device is a right hearing device, it can eavesdrop right audio packet information. The eavesdropping operation can also be referred to as "sniffing" or "spoofing", but it is more accurate to refer to it as eavesdropping because a user intends that the second hearing device receive the audio information for the stream.

At wireless connection operation 803, a hearing device 103 wirelessly connects with another hearing device 103.

At monitoring quality operation 804, each of the primary hearing device and the secondary hearing device, can independently, monitor the quality of the first wireless link that provides a bi-directional wireless connection between the primary hearing device and the wireless communication device, and the quality of the second wireless link between the wireless communication device and the secondary hearing device. The primary hearing device can periodically receive or retrieve statistics from the secondary hearing device regarding the monitored quality of the first and/or the second wireless links. Based on processing of the retrieved statistics regarding the monitored quality of the first and/or the second wireless links, the primary hearing device can determine whether a handover (e.g., transferring the role of transmission of audio-related packets towards the wireless communication device) to the secondary hearing device is necessary. For example, the role of transmission of audio-related packets towards the wireless communication device can be switched based on a determination that the monitored quality of the first wireless link 20 (shown in FIG. 2) is bad (as described below with reference to FIG. 9), or based on a determination that the monitored quality of the second wireless link 30 (shown in FIG. 2) is good (as described below with reference to FIG. 9). If such transfer of the role of transmission of audio-related packets towards the wireless communication device is determined to be necessary, the primary hearing device can instruct the secondary hearing device that the roles of transmission of audio-related packets towards the wireless communication device are changing (e.g., switching) for the next period (which can be between 50 ms and 100 ms, for example, to ensure quick reaction to changing wireless conditions, but at the same time is sufficiently long to collect statistics and perform a reliable link quality estimation).

In a point-to-point protocol, a packet is formatted in 8-bit bytes, and can include control information and data, which is also known as the payload. Control information can provide data for delivering the payload, such as source and destination network addresses, error detection codes, and sequencing information, for example. Typically, control information can be found in the packet header. An audio packet can be considered corrupted if at least one bit is erroneous. In digital transmission, the number of bit errors is the number of received bits of a data stream over a communication channel that has been altered due to noise, interference, distortion, or bit synchronization errors. A packet error rate (PER) (also known as packet error rate) of a transmission via the point-to-point protocol (e.g., the wireless link) is the number of incorrectly received data packets divided by the total number of received packets. The packet error rate (PER) is used to test and measure the performance of a receiver.

Because the transmit powers of the first hearing device 14 and the mobile phone 12 (shown in FIG. 2) are different (e.g., asymmetric), when the distance between the first hearing device 14 and the mobile phone 12 exceeds a certain range, the quality of the wireless link 20 can deteriorate. As a result of the deteriorated quality of the wireless link 20, the audio packets transmitted from the first hearing device 14 to the mobile phone 12 can be corrupted or not received at all, and the quality of the audio transmitted from the first hearing device 14 to the mobile phone 12 can deteriorate.

As discussed above with reference to FIG. 2, the transceiver 26', 26" of the first hearing device 14 and the second hearing device 16, respectively, may include its own Bluetooth on-board signal processor 23. In this embodiment, the processor 23 of the transceiver 26' of the first hearing device 14 can be configured to measure or estimate the outgoing packet error rate (PerTx) on the wireless link 20 between the first hearing device 14 and the mobile phone 12. Alternatively, the processor 22' of the first hearing device 14 can be configured to measure or estimate the outgoing packet error rate (PerTx). As yet another alternative, the outgoing packet error rate (PerTx) on the wireless link 20 can be estimated by a processor of the mobile phone 12. Similarly, the processor 22' or 23' of the transceiver 26" of the second hearing device 16 can be configured to measure or estimate the outgoing packet error rate (PerTx) on the wireless link between the second hearing device 16 and the mobile phone 12. In other words, each of the first and second hearing devices 12 and 14 can independently measure the outgoing packet error rate (PerTx) for audio-related packets transmitted by the hearing devices towards the mobile phone 12.

The PerTx measurement is performed on the hearing device that is connected bi-directionally with the mobile phone 12. In the example illustrated in FIG. 2, the hearing device that is connected bi-directionally with the mobile phone 12 is the first hearing device 14. However, in other examples, the hearing device that is connected bi-directionally with the mobile phone 12 can be the second hearing device 16. In the example when the hearing device 14 is connected bi-directionally with the mobile phone 12, the processor 23 of the transceiver 26' can be configured to compute the outgoing packet error rate PerTx by monitoring the number of the retransmissions from the first hearing device 14 towards the mobile phone 12. Retransmissions from the first hearing device 14 towards the mobile phone 12 are performed when an audio packet from the first hearing device 14 is not received or is received corrupted by the wireless communication device 12. In this situation, the wireless communication device 12 can transmit an error signal across the wireless link 20 to the first hearing device 14 to request retransmission of the audio packet. Alternatively, because the wireless link 20 may be configured for transmission of acknowledgements by the mobile phone 12 that an audio packet from the first hearing device 14 was successfully received, the first hearing device 14 may retransmit the audio packet to the wireless communication device when the first hearing device 14 has not received an acknowledgment from the mobile phone 12 of a successful receipt of the audio packet.

In other embodiments, in the A2DP case, the processor 23 of the transceiver 26' can be configured to compute the outgoing packet error rate PerTx by monitoring duplicate incoming audio packets transmitted by the wireless communication device 12.

from the first hearing device 14 towards the mobile phone 12.

Figure 9:
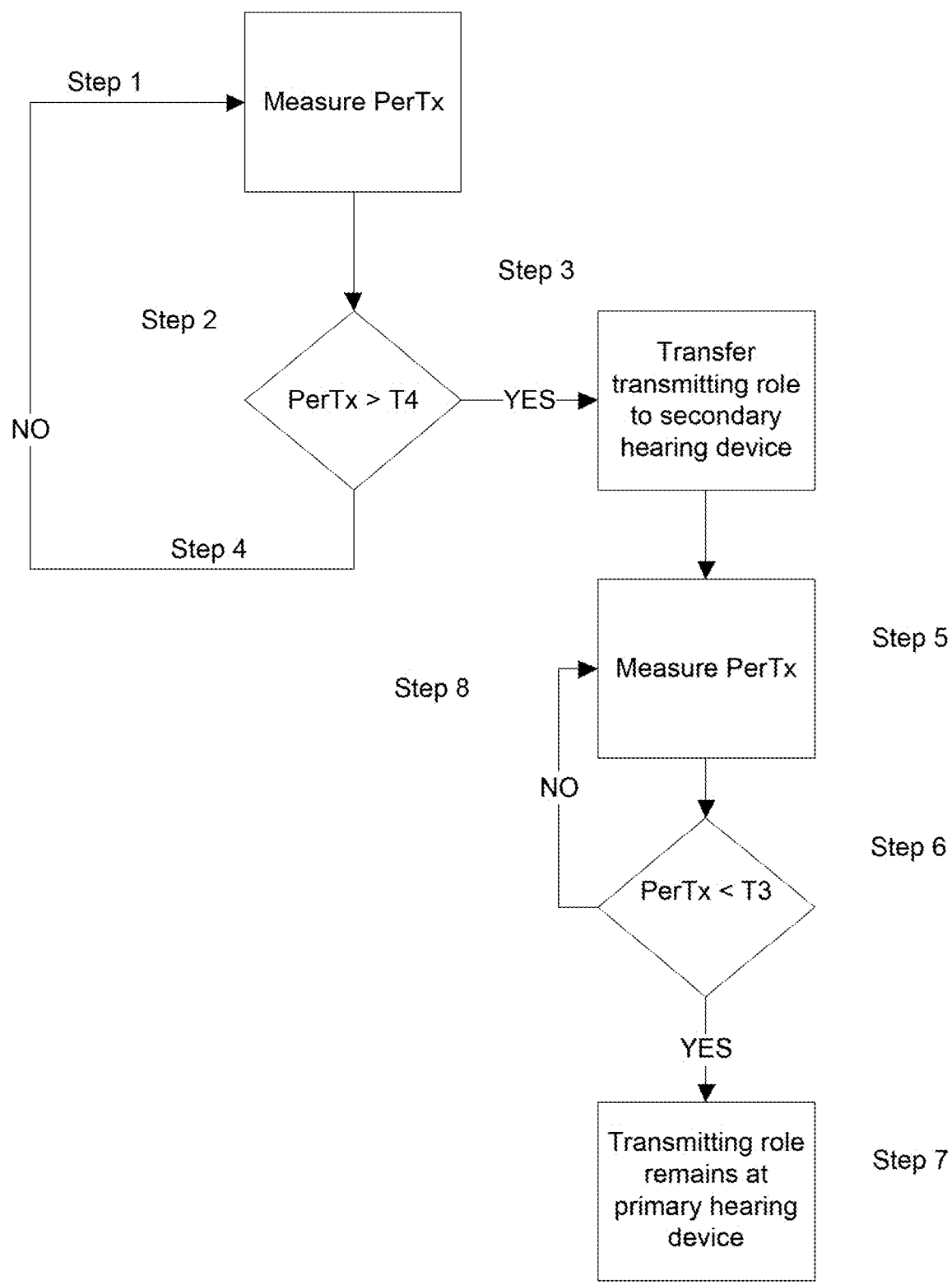
FIG. 9 is a flowchart illustrating a process of implementing diversity based on role switch, according to an embodiment.

As illustrated in FIG. 9, in Step 1, the processor 23 of the transceiver 26' measures the outgoing packet error rate PerTx.

In Step 2, the processor 23 of the transceiver 26' checks whether the outgoing packet error rate PerTx is above a threshold T4 ("bad threshold"). When the outgoing packet error rate PerTx is above a certain threshold, the quality of the audio link has deteriorated to the point that the audio is not understandable and the wireless link is considered bad. The audio error rate above which audio is not understandable is typically around 20%, but may vary depending on context. A Bluetooth Hands-Free Profile ("HFP") audio link may be configured to use two or three transmit attempts $N_T$. Sometimes, even if a wireless link is negotiated by the mobile phone to use three transmits attempts, the third transmit attempt may not be listened to by the mobile phone. Therefore, typically only two transmit attempts are available even if the link allows for a third transmit.

With a Modified SBC Codec (mSBC) for Bluetooth devices, at 1 Mbps, one audio frame of 7.5 ms is transmitted in two radio packets. The Average Frame Error Rate (FER) can be calculated with the formula: $FER=1-(1-PER^{N_T})^2$.

With a Continuously variable slope delta modulation (CVSD), at 1 Mbps, one audio frame of 3.75 ms is transmitted in one radio packet. The Average Frame Error Rate (FER) can be calculated with the formula: $FER=PER^{N_T}$, where PER is the outgoing packet error rate PerTx. The outgoing packet error rate PerTx can be calculated by monitoring the number of transmit attempts of outgoing audio frames from the hearing device towards the wireless communication device, for example.

Assuming that the audio error rate above which audio is not understandable is 20%, the bad audio state can be entered if the outgoing packet error rate PerTx is above $1-(1-0.2)^{(1/2)})^{(1/2)}=32\%$ and $(1-(1-0.2)^{(1/2)})^{(1/3)}=47\%$ with two and three transmit attempts, respectively. Considering the case of two transmit attempts, the bad audio threshold T4 can preferably be chosen at T4=0.32.

Turning back to FIG. 9, in Step 3, if the outgoing packet error rate PerTx is above the threshold T4, the processor 22' transfers the role of transmitting audio-related packets towards the wireless communication device from the primary device 14 to the secondary device 16. Alternatively, the role transfer may be performed by the processor 23 of the transceiver 26'. As yet another alternative, the role transfer may be performed by the processor of the mobile phone 12.

In Step 4, if the outgoing packet error rate PerTx is not above the threshold T4, the processor 23 of the transceiver 26' measures again the outgoing packet error rate PerTx in Step 1.

In Step 5, during bad audio state, the processor 23 of the transceiver 26' measures again the outgoing packet error rate PerTx, and in Step 6, the processor 23 of the transceiver 26' checks whether the outgoing packet error rate PerTx is below another threshold T3 (the "good threshold"), which is lower than the threshold T4. If the outgoing packet error rate PerTx is below the good audio threshold T3, in Step 7 the processor 23 of the transceiver 26' maintains the role of transmitting audio related packets to the primary hearing device 14.

The value of the good audio threshold T3 can be chosen sufficiently below the bad audio threshold T4 to avoid rapid toggling between good and bad audio. At 20% outgoing packet error rate PerTx, the audio error rate is $1-(1-0.2^2)^2=7.8\%$ with two transmits and $1-(1-0.2^3)^2=1.6\%$ with three transmits. At 7.8% audio error rate, the audio is understandable and a good audio state can be entered. Accordingly, the present embodiment can select T3 to be 20%.

In Step 8, when the outgoing packet error rate PerTx is not below the threshold T3, the process continues with the processor 23 of the transceiver 26' measuring again the outgoing packet error rate PerTx in Step 5.

In certain embodiments, the process illustrated in FIG. 9 may be performed by considering the incoming packet error rate, as opposed to the outgoing packet error rate.

In another embodiment, the hearing system 10 can be configured to automatically adapt the transmitted power of the hearing device as a function of the outgoing audio link packet error rate.

The conducted transmit power is the transmit power that a radio frequency (RF) transmitter (e.g., radio chip) produces at its output or the transmit power of the radio chip measured when a power meter is connected to the radio chip in place of the antenna. The effective radiated power (ERP) or the effective isotropic radiated power (EIRP), also known as a radiated power, is the effective power produced at the output of the radio chip including the ability of the antenna to direct that power in a certain direction or in the direction of the antenna's strongest beam, respectively. The conducted transmit power is relevant for link asymmetry, since the effect of the antenna is symmetric on both the transmit and receive paths.

In the present embodiment, the hearing device can decide autonomously whether to use a higher or a lower transmit power. This embodiment has the advantage of minimizing the power consumption in the hearing device via using a lower transmit power whenever possible.

The methods of the embodiments described above applies to an Enhanced Synchronous connection-oriented ("eSCO") link or a wireless link that uses the eSCO transport option of the Bluetooth specification. With Synchronous connection-oriented ("SCO") links (e.g., where each device transmits encoded voice data in a reserved timeslot or a reserved frame, without retransmits), it may not be possible to reliably estimate the transmit Tx link quality. Enhanced SCO (eSCO) links allow greater flexibility in that they may use retransmissions to achieve reliability, allow a wider variety of packet types, and greater intervals between packets than SCO, thus increasing radio availability for other links.

In this embodiment, the PerTx estimation can be based only on the first transmit attempt of every eSCO frame, and can include the following steps:

At the establishment of an eSCO link, the processor 23 of the transceiver 26' can set the following values for the outgoing packet error rate PerTx and the bad HFP transmit link:

$$PerTx = 0$$

$$hfpTxLinkBad = 0$$

After every eSCO frame (i.e., every 3.75 ms), the processor 23 of the transceiver 26' can retrieve transmit count (txCnt) and receive count (rxCnt), which indicate how many attempts have occurred to transmit and receive an audio frame, respectively.

The processor 23 of the transceiver 26' can then check whether no header has been received or both rxCnt and txCnt are >1 (i.e., whether neither the first reception nor the first transmit attempt was successful):

If true (i.e., no header has been received or both rxCnt and txCnt are >1), the processor 23 of the transceiver 26' can set the value for the transmit error txError to 1.

If false, the processor 23 of the transceiver 26' can set txError to 1 if txCnt>1 (i.e., the first transmit attempt was not successful) or to 0 otherwise.

The processor 23 of the transceiver 26' can then update PerTx using the formula PerTx=min((1−1/256)*PerTx+1/256*txError; T4)

The value PerTx can be saturated at the threshold value T4 via the function min(X; T4), such that the time needed to reach the good audio state when the link is good again is fixed.

The methods of the embodiments described above can apply to a wireless link that uses the isochronous transport option of the Bluetooth specification. For certain communication links, only a limited amount of delay is allowed and retransmissions are allowed up to a certain limit at which the current payload must be disregarded and the next payload must be considered. This data transfer is known as isochronous traffic. In other words, the retransmit process must be overruled in order to continue with the next data payload. Aborting the retransmit scheme can be accomplished by flushing the old data and forcing the Bluetooth controller to take the next data instead.

The packet error rate estimate PerTx can be implemented using an exponential moving speed average according to the formula PerTx(k)=(1−a)*PerTx(k−1)+a*txError, where "a" is the degree of weighting decrease; and txError takes the value 1 if a transmitted packet is observed to have been lost and the value 0 if a transmitted packet is observed to have been received. The variable "a" sets the moving average speed. This parameter can be chosen as a trade-off between speed of bad link detection and accuracy of measurement. The value a=1/256 can be selected to provide a detection time that is close to one second, but not exceeding one second. This selection can provide the highest accuracy while not being too slow.

In certain embodiments, the audio link quality may be estimated via Received Signal Strength Indicator ("RSSI"). Specifically, instead of keeping statistics of the effective errors on the outgoing audio link, the signal strength of the incoming audio link can be measured and the expected audio link quality can be deduced on the outgoing link.

Other embodiments can monitor the incoming audio link. For example, the incoming audio quality may be monitored via packet error statistics. A notification can be transmitted to the user when the audio quality is bad in either or in both the incoming and outgoing directions.

At determining transmission of audio-related packets operation 805, the first hearing device determines that it will transmit an audio-related packet towards the wireless communication device 102. As described above with reference to FIG. 7, the destination Channel ID (CID) field within the L2CAP packet caries information about whether an L2CAP packet carries A2DP audio or signaling. For example, if the content of the CID field of the L2CAP packet corresponds to the destination channel endpoint that has been configured for A2DP audio packets when the A2DP connection has been established, the hearing device can determine that the packet is an audio-related packet.

Turning back to FIG. 8, at diversity operation 806, two hearing devices implement a diversity scheme. In a diversity scheme, the hearing devices communicate and work together to receive and transmit information that increases (e.g., maximizes) the probability that the wireless communication device (e.g., audio source such as a smartphone) receives an ACK packet. Specifically, if both hearing devices successfully receive an audio packet, either hearing devices (e.g., first or second, primary or secondary) can transmit an ACK packet to the wireless communication device to acknowledge receipt of the audio packet. If only the first hearing device (e.g., primary hearing device or master hearing device) successfully receives an audio packet, the primary hearing device can forward the audio packet to the second hearing device (e.g., secondary device) and the first hearing device can transmit an ACK packet to the wireless communication device. If only the second hearing device successfully receives an audio packet, the secondary hearing device can forward the audio packet to the first hearing device (e.g., primary device) and the secondary hearing device can transmit an ACK packet to the wireless communication device.

In some implementations, the wireless communication device can continue to transmit audio stream using A2DP to the first hearing device while the second hearing device eavesdrops. However, during an audio stream it is necessary to exchange both audio packet information (e.g., payloads) and signaling information. The signaling information is generally bidirectional, and thus the wireless communication device or the first hearing device may need to receive or to transmit signaling information to successfully transmit or receive or use the audio stream. Also, in general, the secondary hearing device does not exchange signaling information directly with the wireless communication device (e.g., because it is eavesdropping).

Based on the determining transmission of audio-related packets operation 805, the first hearing device can determine that audio-related packets are being sent from the wireless communication device to the first hearing device or that the first hearing device needs to transmit an audio-related packet. It is at this time that, depending on the quality of the wireless connection between the two hearing devices and the wireless communication device, one of the hearing devices can be assigned the role of transmitting audio-related packets towards the wireless communication device, and the other hearing device can suspend (stop) transmitting audio-related packets (e.g., towards the wireless communication device, forwarding audio packets to the other hearing device, or sending acknowledgment packets to successfully received audio packet from the wireless communication device). Normally, when a diversity scheme is implemented either the first or the second hearing device transmits acknowledgment packets; however, when the diversity scheme with role switch is implemented, it means the second hearing device does not transmit audio-related packets towards the wireless communication device when the first hearing device been has assigned the role of transmitting audio-related packets towards the wireless communication device.

At the same time, when the diversity scheme with role switch is implemented, during audio streaming from the wireless communication device, the primary hearing device remains in a wireless connection with the wireless communication device, and continues to transmit to the wireless communication device packets that are not audio-related, regardless of which hearing device has the role of transmitting audio-related packets towards the wireless communication device. Packets that are not audio-related can be control packets or signaling packets, as described with reference to FIG. 7, for example.

Aspects and implementations of the process 800 have been disclosed in the general context of various steps and operations. A variety of these steps and operations may be performed by hardware components or may be embodied in computer-executable instructions, which may be used to cause a general-purpose or special-purpose processor (e.g., in a controller, computer, server, or other computing device) programmed with the instructions to perform the steps or operations. The steps or operations may be performed by a combination of hardware, software, and/or firmware such with a wireless communication device or a hearing device. For example, the operations 804, 805, and 806 can be repeated each time an audio-related packet is transmitted and/or received, and it may not be necessary to perform operations 801, 802, and 803 again. In some implementations, the process 800 can run continuously and/or automatically based on the hearing device turning on or streaming audio information.

The phrases "in some implementations," "according to some implementations," "in the implementations shown," "in other implementations," and generally mean a feature, structure, or characteristic following the phrase is included in at least one implementation of the disclosure, and may be included in more than one implementation. In addition, such phrases do not necessarily refer to the same implementations or different implementations.

The techniques introduced here can be embodied as special-purpose hardware (e.g., circuitry), as programmable circuitry appropriately programmed with software or firmware, or as a combination of special-purpose and programmable circuitry. Hence, implementations may include a machine-readable medium having stored thereon instructions which may be used to program a computer (or other electronic devices) to perform a process. The machine-readable medium may include, but is not limited to, optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. In some implementations, the machine-readable medium is non-transitory computer readable medium, where in non-transitory excludes a propagating signal.

The above detailed description of examples of the disclosure is not intended to be exhaustive or to limit the disclosure to the precise form disclosed above. While specific examples for the disclosure are described above for illustrative purposes, various equivalent modifications are possible within the scope of the disclosure, as those skilled in the relevant art will recognize. For example, while processes or blocks are presented in an order, alternative implementations may perform routines having steps, or employ systems having blocks, in a different order, and some processes or blocks may be deleted, moved, added, subdivided, combined, or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc. As another example, "A or B" can be only A, only B, or A and B.

Many other example embodiments can be provided through various combinations of the above described features. Although the embodiments described hereinabove use specific examples and alternatives, it will be understood by those skilled in the art that various additional alternatives may be used and equivalents may be substituted for elements and/or steps described herein, without necessarily deviating from the intended scope of the application. Modifications may be desirable to adapt the embodiments to a particular situation or to particular needs without departing from the intended scope of the application. It is intended that the application not be limited to the particular example implementations and example embodiments described herein, but that the claims be given their broadest reasonable interpretation to cover all novel and non-obvious embodiments, literal or equivalent, disclosed or not, covered thereby.

What is claimed is:

1. A method for operating two hearing devices, the method comprising:
   establishing a first bi-directional wireless connection between a primary hearing device and a wireless communication device over a first wireless link;
   eavesdropping on the first wireless link, by a secondary hearing device, over a second wireless link between the wireless communication device and the secondary hearing device;
   establishing a second bi-directional wireless connection between the primary hearing device and the secondary hearing device over a third wireless link;

monitoring, by the primary hearing device, a link quality of the first wireless link and/or by the secondary hearing device, the link quality of the second wireless link;
assigning to the secondary hearing device a role of transmitting audio-related packets towards the wireless communication device, in place of the primary hearing device, based on quality parameters of at least one of the first wireless link or the second wireless link; and
returning to the primary hearing device the role of transmitting audio-related packets towards the wireless communication device based on the quality parameters of at least one of the first wireless link or the second wireless link,
wherein during audio streaming, the primary hearing device remains in the first bi-directional wireless connection with the wireless communication device and transmits to the wireless communication device packets that are not audio-related, regardless of which hearing device has the role of transmitting audio-related packets towards the wireless communication device.

2. The method according to claim 1, wherein the assigning to the secondary hearing device the role of transmitting audio-related packets towards the wireless communication device is based on one of a degradation of the first wireless link quality or an improvement of the second wireless link quality.

3. The method according to claim 1, wherein the returning to the primary hearing device the role of transmitting audio-related packets towards the wireless communication device is based on one of a degradation of the second wireless link quality or an improvement of the first wireless link quality.

4. The method according to claim 1, wherein the wireless link quality of the first or second wireless link is measured via measuring an outgoing packet error rate for the audio-related packets transmitted by the primary hearing device or the secondary hearing device towards the wireless communication device.

5. The method according to claim 4, wherein the outgoing packet error rate is calculated by monitoring a number of transmit attempts of outgoing audio frames.

6. The method according to claim 4, wherein the outgoing packet error rate is calculated by monitoring duplicate incoming audio packets transmitted by the wireless communication device.

7. The method according to claim 4, wherein the role of transmitting audio-related packets is transferred from the primary hearing device to the secondary hearing device when the outgoing packet error rate on the first wireless link exceeds a predefined threshold.

8. The method according to claim 1, wherein the wireless link quality of the first or second wireless link is measured via measuring an incoming packet error rate.

9. The method according to claim 1, wherein the role of transmitting audio-related packets is transferred from the secondary hearing device to the primary hearing device when the outgoing packet error rate on the second wireless link exceeds a predefined threshold.

10. The method according to claim 1, wherein the role of transmitting audio-related packets is transferred from the primary hearing device to the secondary hearing device when the incoming packet error rate on the second wireless link is lower than the incoming packet error rate on the first wireless link.

11. The method according to claim 1, wherein the role of transmitting audio-related packets is transferred from the secondary hearing device to the primary hearing device when the incoming packet error rate on the first wireless link is lower than the incoming packet error rate on the second wireless link.

12. The method according to claim 1, wherein the audio-related packets are at least one of audio packets or acknowledgements to audio packets.

13. The method according to claim 1, wherein the audio-related packets are transmitted using a Logical Link Control and Adaptation Protocol (L2CAP) with a destination Channel ID (CID) field that corresponds to a destination channel endpoint that has been configured for an Advanced Audio Distribution Profile (A2DP) audio packets when an A2DP connection has been established.

14. The method according to claim 1, wherein the audio-related packets are Enhanced Synchronous connection-oriented ("eSCO") audio packets.

15. The according to claim 1, wherein the first and second wireless links and the third wireless link use different wireless communication protocols.

16. The method according to claim 1, wherein a communication protocol used in the first and second wireless links is associated with BLUETOOTH and a communication protocol used in the third wireless link is a proprietary wireless communication protocol.

17. The method according to claim 1, wherein the packets that are not audio related are one of a Link Management Protocol (LMP) data unit or a Logical Link Control and Adaptation Protocol (L2CAP) data unit addressed to a CID different than a destination channel endpoint for A2DP.

18. The method according to claim 1, wherein during audio streaming, the primary hearing device transmits to the wireless communication device packets that are not audio-related when the secondary hearing device has the role of transmitting audio-related packets towards the wireless communication device.

19. The method according to claim 1, wherein during audio streaming, the primary hearing device and the secondary hearing device transmit at the same time to the wireless communication device packets that are not audio-related and audio-related packets, respectively.

20. An audio communication system comprising:
a primary hearing device configured to establish a first bi-directional wireless connection with a wireless communication device over a first wireless link; and
a secondary hearing device configured to:
eavesdrop on the first wireless link, over a second wireless link between the wireless communication device and the secondary hearing device, and
establish a second bi-directional wireless connection with the primary hearing device over a third wireless link, wherein:
the primary hearing device and the secondary hearing device are both configured to:
monitor a link quality of the first wireless link and/or the link quality of the second wireless link;
assign to the secondary hearing device a role of transmitting audio-related packets towards the wireless communication device, in place of the primary hearing device, based on quality parameters of at least one of the first wireless link or the second wireless link; and
return to the primary hearing device the role of transmitting audio-related packets towards the wireless communication device based on the quality parameters of at least one of the first wireless link or the second wireless link, wherein during audio streaming, the primary hearing device remains in the first bi-directional wireless connection with the wireless communication device and transmits to the wireless communication device packets that are not audio-related, regardless of which hearing device has the role of transmitting audio-related packets towards the wireless communication device.

21. A method for operating two hearing devices, the method comprising:

establishing a first bi-directional wireless connection between a primary hearing device and a wireless communication device over a first wireless link;

eavesdropping on the first wireless link, by a secondary hearing device, over a second wireless link between the wireless communication device and the secondary hearing device;

establishing a second bi-directional wireless connection between the primary hearing device and the secondary hearing device over a third wireless link;

monitoring, by the primary hearing device, a link quality of the first wireless link and/or by the secondary hearing device, the link quality of the second wireless link;

assigning to the secondary hearing device a role of transmitting audio-related packets towards the wireless communication device, in place of the primary hearing device, based on quality parameters of at least one of the first wireless link or the second wireless link; and returning to the primary hearing device the role of transmitting audio-related packets towards the wireless communication device based on the quality parameters of at least one of the first wireless link or the second wireless link, wherein the wireless link quality of the first or second wireless link is measured via measuring an outgoing packet error rate for the audio-related packets transmitted by the primary hearing device or the secondary hearing device towards the wireless communication device.

\* \* \* \* \*